(12) United States Patent
Cancelliere et al.

(10) Patent No.: US 11,125,905 B2
(45) Date of Patent: Sep. 21, 2021

(54) METHODS FOR AUTOMATED HISTORY MATCHING UTILIZING MUON TOMOGRAPHY

(71) Applicant: SAUDI ARABIAN OIL COMPANY, Dhahran (SA)

(72) Inventors: Michel Cancelliere, Dhahran (SA); Ozgur Kirlangic, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 272 days.

(21) Appl. No.: 16/402,317

(22) Filed: May 3, 2019

(65) Prior Publication Data

US 2020/0348440 A1    Nov. 5, 2020

(51) Int. Cl.
*G01V 5/00* (2006.01)
*G01V 99/00* (2009.01)

(52) U.S. Cl.
CPC .......... *G01V 5/0075* (2013.01); *G01V 99/005* (2013.01)

(58) Field of Classification Search
None
See application file for complete search history.

(56) References Cited

U.S. PATENT DOCUMENTS

| | | | |
|---|---|---|---|
| 4,504,438 A * | 3/1985 | Levy | G01V 5/04 376/156 |
| 7,488,934 B2 | 2/2009 | Bryman | |
| 7,531,791 B2 | 5/2009 | Bryman | |
| 8,288,721 B2 | 10/2012 | Morris et al. | |
| 8,384,017 B2 | 2/2013 | Botto | |
| 8,536,527 B2 | 9/2013 | Morris et al. | |
| 9,423,362 B2 | 8/2016 | Sossong et al. | |
| 9,639,973 B2 | 5/2017 | Bai et al. | |
| 9,746,580 B2 | 8/2017 | Hayes et al. | |
| 9,784,859 B2 | 10/2017 | Blanpied et al. | |
| 9,915,626 B2 | 3/2018 | Blanpied et al. | |
| 9,939,537 B2 | 4/2018 | Sossong | |
| 10,042,079 B2 | 8/2018 | Patnaik | |

(Continued)

FOREIGN PATENT DOCUMENTS

| | | |
|---|---|---|
| JP | 2013002830 A | 1/2013 |
| WO | 2013155075 A1 | 10/2013 |
| WO | 2017194647 A1 | 11/2017 |

OTHER PUBLICATIONS

Antonuccio, et al., The Muon Portal Project:Development of an Innovative Scanning Portal Based on Muon Tomography, 2013 3rd International Conference on ANIMMA, 978-1-4799-1047—Feb. 2013, © 2013 IEEE.

(Continued)

*Primary Examiner* — Roy Y Yi
(74) *Attorney, Agent, or Firm* — Bracewell; Constance G. Rhebergen; Christopher L. Drymalla

(57) ABSTRACT

Embodiments provide a method for surveying a hydrocarbon reservoir utilizing a reservoir model. The method includes the step of establishing an ensemble of models reflecting attributes of the hydrocarbon reservoir based on the reservoir model in its present state. The method includes the step of updating the reservoir model by utilizing a volumetric density image of the hydrocarbon reservoir. The volumetric density image can be constructed via muon tomography.

23 Claims, 2 Drawing Sheets

(56) References Cited

U.S. PATENT DOCUMENTS

| | | | |
|---|---|---|---|
| 2008/0128604 A1* | 6/2008 | Bryman | G01T 1/203 250/266 |
| 2008/0315091 A1 | 12/2008 | Morris et al. | |
| 2010/0198570 A1 | 8/2010 | Sarma et al. | |
| 2011/0035151 A1 | 2/2011 | Botto | |
| 2012/0215511 A1* | 8/2012 | Sarma | G01V 1/308 703/10 |
| 2014/0091803 A1 | 4/2014 | Dodds et al. | |
| 2015/0247940 A1 | 9/2015 | De Matos Ravanelli et al. | |
| 2016/0018541 A1 | 1/2016 | Stefani | |
| 2016/0116630 A1 | 4/2016 | Sossong | |
| 2017/0329039 A1 | 11/2017 | Kang et al. | |

OTHER PUBLICATIONS

Bonneville, Borehole Muon Detector for 4D Density Tomography of Subsurface Reservoirs, Presentation, Carbon Storage and Oil and Natural Gas Technologies Review Meeting (2016).

Bonneville, et al., A novel muon detector for borehole density tomography, 851 Nuclear Instruments and Methods in Physics Research Section A 108 (2017).

Jaenisch, et al., Muon Imaging and Data Modeling, Proceedings of SPIE—The International Society for Optical Engineering, May 2007.

Jaenisch, et al., Real Time Muon Tomography Imaging Simulation and Fast Threat Target Identification, Proceedings of SPIE—The International Society for Optical Engineering 7310, May 2009.

Jiang, et al., Modelling and Monitoring of Geological Carbon Storage, Applied Energy 112 (2013) 784-792.

Kudryavtsev, et al., Monitoring subsurface CO2 emplacement and security of storage using muon tomography, 11 International Journal of Greenhouse Gas Control 21 (2012).

Lesparre, et al., 3D Density Imaging with Muon Flux Measurements from Underground Galleries, Geophysical Journal International Advance Access published Dec. 23, 2016, 36 pages.

Valestrand, et al., The Effect of Including Tracer Data in the EnKF Approach, SPE-113440 (2008).

Zagayevskiy, et al., Assimilation of Time-Lapse Temperature Observations and 4D-Seismic Data With the EnKF in SAGD Petroleum Reservoirs, SPE-174547 (2015).

Zhong, et al., A case study of using cosmic ray muons to monitor supercritical CO2 migration in geological formations, 185 Applied Energy 1450 (2017).

Dabboor, O., "On the Detectability of Density Distributions of Asgteroids and SAGD Reservoirs Using Gravimetry and Muon Tomography," Queen's University, a Thesis to the Department of Geological Sciences and Geological Engineering, Oct. 31, 2018, 144 pages.

International Search Report and Written Opinion for PCT Application No. PCT/US2020/031167 dated Sep. 18, 2020, 23 pages.

* cited by examiner

METHODS FOR AUTOMATED HISTORY MATCHING UTILIZING MUON TOMOGRAPHY

BACKGROUND

Field of the Disclosure

Embodiments of the disclosure generally relate to hydrocarbon reservoir modelling.

Description of the Related Art

The development of a hydrocarbon reservoir may require an understanding of the reservoir geology for appropriately selecting means for hydrocarbon extraction and adequately placing production wells, injection wells, and surface facilities. Various reservoir modelling and visualization tools have been developed to better understand the reservoir geology in order to make decisions regarding reservoir development. Such modelling and visualization tools include certain computational means to generate production forecasts and optimize field performance. Typically, actual data are acquired at various observation locations of the reservoir and are integrated into a reservoir simulation model. This way, discrepancies between the reservoir simulation model and the real reservoir can be reduced.

Conventional history matching techniques are used for identifying and minimizing such discrepancies, where a reservoir simulation model is iteratively calibrated until the calibration results in an acceptable reproduction of reservoir behavior prior to the adjustment. The accuracy of these history matching techniques depends on the quality of the reservoir simulation model and the quality and quantity of the actual data. A history matched reservoir model can be used to predict future reservoir behavior with an enhanced degree of confidence, especially in cases where the adjustments are constrained by actual geological properties of the reservoir and actual fluid properties in the reservoir.

SUMMARY

Embodiments of the disclosure generally relate to hydrocarbon reservoir modelling utilizing muon tomography. More specifically, embodiments of the disclosure relate to methods for modelling a hydrocarbon reservoir utilizing muon tomography by detecting muons and constructing volumetric density images of a hydrocarbon reservoir to enhance the hydrocarbon reservoir model.

Reservoir modelling involves inherent errors and approximations that result in uncertainties that cannot be fully eliminated. Because the actual data that can be acquired are limited, the actual data cannot be solely relied on to visualize the entire spatial configuration of the reservoir model.

Conventional history matching techniques are used for identifying and minimizing such uncertainties. However, conventional history matching techniques require trial and error and can be consuming in terms of time and computing power. Also, conventional history matching techniques may result in the calibration of the reservoir simulation model deriving non-unique solutions.

Automated history matching techniques are introduced to alleviate the drawbacks associated with conventional history matching. Automated history matching techniques are used to treat history matching as an optimization process, where a cost function is defined representative of the discrepancy between actual and simulated data, and the cost function is minimized. The minimization of the cost function can be obtained by applying an optimization algorithm. Although techniques such as optimization and non-linear programming are not new in the art, the selection of the most adequate optimization algorithm is not trivial, and the number of independent variables involved in complex reservoir simulation does not make the solution of the optimization problem a standard procedure.

Muons originating from cosmic rays can generate time-dependent images of reservoirs due to their ability to penetrate into the subsurface in the order of hundreds of meters. These real time volumetric density images (or "4D data") obtained from such muon sources can be utilized to automatically update or calibrate numerically calculated reservoir models. Such cosmic ray muon tomography (or muography) can be complemented with history matching algorithms such as Ensemble Kalman Filtering (EnKF) or Ensemble Kalman Smoothing (EnKS).

Advantageously, muography based history matching increases the accuracy of the calibration, provide multiple calibrated models, and ease the history matching process, thus allowing more time and computing power for optimization versus not using such history matching techniques. Advantageously, an accurate reservoir model can be achieved using muography based history matching techniques even when the muographic images have low resolution, that is, the muographic images are pixelated. This is due to the muographic 4D data being continuously, or at least periodically, fed into the history matching loops to improve the calibration process.

Muon detectors combined with muon tomography allow volumetric imaging of the subterranean density distribution and its evolution in real time in hydrocarbon reservoirs, which may serve as an effective surveying method compared to conventional methods such as 4D seismology. Seismic 4D data are collected at specific points in time, where the sensitivity of the seismic data with respect to the varying density is lesser than that of muographic 4D data. In addition, 4D seismology requires the generation of seismic waves, which is not a requirement for 4D muography.

Embodiments of the disclosure provide a method for surveying a hydrocarbon reservoir utilizing a reservoir model. The method includes the step of establishing an ensemble of models reflecting attributes of the hydrocarbon reservoir based on the reservoir model in its present state. The method includes the step of updating the reservoir model by utilizing a volumetric density image of the hydrocarbon reservoir.

In some embodiments, the volumetric density image is constructed via muon tomography. In some embodiments, the method further includes the step of forecasting a hydrocarbon production from the hydrocarbon reservoir with the reservoir model in the updating step. In some embodiments, the method further includes the step of imaging the reservoir model in the updating step. In some embodiments, the updating step includes performing EnKF or EnKS. In some embodiments, the attributes of the hydrocarbon reservoir include static data or dynamic data. In some embodiments, the updating step includes providing production data to update the reservoir model. In some embodiments, the method further includes the step of comparing the production data and the reservoir model in the updating step. In some embodiments, the comparing step includes correcting input parameters of the reservoir model when a difference between the production data and the reservoir model deviates from a predetermined value.

Embodiments of the disclosure also provide a method for surveying a hydrocarbon reservoir utilizing a reservoir model. The method includes the step of positioning a muon detector at a subterranean location proximate the hydrocarbon reservoir. The method includes the step of collecting muon detection data from the muon detector over a detection period. The method includes the step of constructing a volumetric density image of the hydrocarbon reservoir by processing the muon detection data via tomography.

In some embodiments, the method further includes the step of updating the reservoir model by utilizing the volumetric density image. In some embodiments, the method further includes the step of forecasting a hydrocarbon production from the hydrocarbon reservoir with the reservoir model in the updating step. In some embodiments, the method further includes the step of imaging the reservoir model in the updating step. In some embodiments, the method further includes the step of collecting a subsequent muon detection data from the muon detector after a time increment. The method further includes the step of constructing a subsequent volumetric density image of the hydrocarbon reservoir by processing the subsequent muon detection data via tomography. The method further includes the step of adjusting the reservoir model in the updating step by utilizing the subsequent volumetric density image. In some embodiments, the muon detector includes a scintillator or a drift tube. In some embodiments, the method further includes the step of altering the detection period based on a resolution of the volumetric density image.

Embodiments of the disclosure also provide a method for surveying a hydrocarbon reservoir utilizing a reservoir model. The method includes the step of establishing an ensemble of models reflecting attributes of the hydrocarbon reservoir based on the reservoir model in its present state. The method includes the step of positioning a muon detector at a subterranean location proximate the hydrocarbon reservoir. The method includes the step of collecting muon detection data from the muon detector over a detection period. The method includes the step of constructing a volumetric density image of the hydrocarbon reservoir by processing the muon detection data via tomography. The method includes the step of updating the reservoir model by utilizing the volumetric density image.

In some embodiments, the method further includes the step of forecasting a hydrocarbon production from the hydrocarbon reservoir with the reservoir model in the updating step. In some embodiments, the method further includes the step of imaging the reservoir model in the updating step. In some embodiments, the updating step includes performing EnKF or EnKS. In some embodiments, the attributes of the hydrocarbon reservoir include static data or dynamic data. In some embodiments, the updating step includes providing production data to update the reservoir model. In some embodiments, the method further includes the step of comparing the production data and the reservoir model in the updating step. In some embodiments, the comparing step includes correcting input parameters of the reservoir model when a difference between the production data and the reservoir model deviates from a predetermined value. In some embodiments, the method further includes the step of collecting a subsequent muon detection data from the muon detector after a time increment. The method further includes the step of constructing a subsequent volumetric density image of the hydrocarbon reservoir by processing the subsequent muon detection data via tomography. The method further includes the step of adjusting the reservoir model in the updating step by utilizing the subsequent volumetric density image. In some embodiments, the method further includes the step of altering the detection period based on a resolution of the volumetric density image.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting of the disclosure's scope as the disclosure may admit to other equally effective embodiments.

Figure 1B:
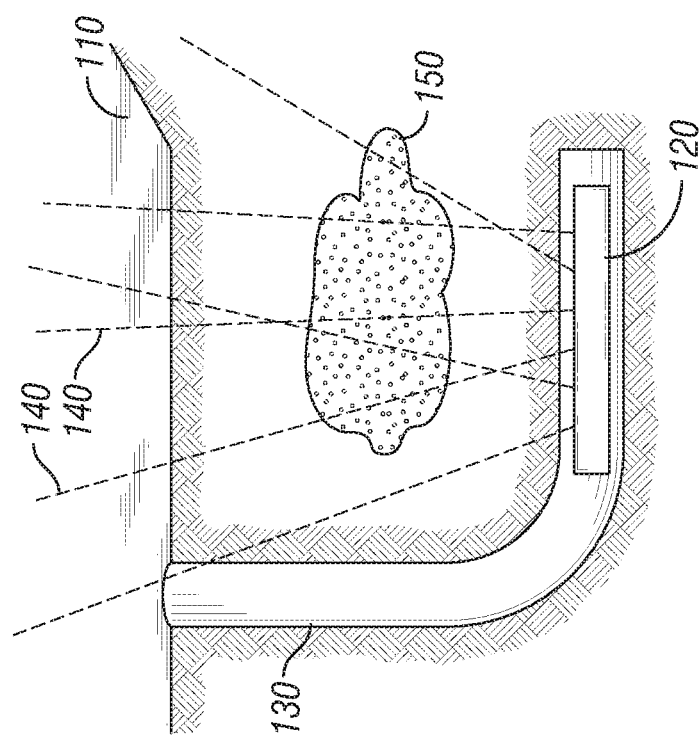
FIGS. 1A-B are graphical representations showing muons penetrating into the earth's surface, in accordance with an embodiment of the disclosure.

In the accompanying Figures, similar components or features, or both, may have a similar reference label.

DETAILED DESCRIPTION

The disclosure refers to particular features, including process or method steps. Those of skill in the art understand that the disclosure is not limited to or by the description of embodiments given in the specification. The subject matter of the disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude.

As used throughout the disclosure, the words "comprise," "has," "includes," and all other grammatical variations are each intended to have an open, non-limiting meaning that does not exclude additional elements, components or steps.

Embodiments of the disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided. "Substantial" means equal to or greater than 1% by the indicated unit of measure. "Significant" means equal to or greater than 0.1% of the indicated unit of measure.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes.

As used throughout the disclosure, the term "state data" include static data, dynamic data, and production data.

As used throughout the disclosure, the term "static data" refer to data such as permeability and porosity field data that were conventionally considered not to vary with time. It should be noted that static data can be updated with time in ensemble based Bayesian filtering methods. Static data may also include well log data, seismic data, core data, geophysical data, and petrophysical data.

As used throughout the disclosure, the term "dynamic data" refer to data such as pressure and phase saturation data of the entire model that correspond to solutions of the flow equations. Dynamic data may also include fluid flow properties such as viscosity and density. Dynamic data may also include pressure, volume, and temperature dependencies for the fluid flow properties.

As used throughout the disclosure, the term "production data" refer to data related to hydrocarbon production that can be measured at wells such as historical data including well production rates, bottom-hole pressure, phase production, injection rate, and water cut. Production data may also include "i-field data." Such "i-field data" includes well data, group data, and separator data, all of which can be delivered in real time to a centralized information technology (IT) system and all of which are accessible to the modeler.

As used throughout the disclosure, the terms "muon tomography," "cosmic ray muon tomography," and "muography" are used interchangeably.

As used throughout the disclosure, the term "resolution" refers to the degree of spatial detail an image holds. Accordingly, a high resolution image includes more spatial detail than a low resolution image. The degree of spatial detail generally corresponds to a pixel count of the image. For example, one skilled in the art may recognize that images having less than about 75 pixels per inch (ppi), alternately less than about 150 ppi, or alternately less than about 300 ppi are considered low resolution images. Respectively, one skilled in the art may recognize that images having greater than about 75 ppi, alternately greater than about 150 ppi, or alternately greater than about 300 ppi are considered high resolution images. As used throughout the disclosure, the term "pixelated image" refers to a low resolution image having less than about 75 ppi, alternately less than about 150 ppi, or alternately less than about 300 ppi.

Muon Tomography

Embodiments of the disclosure relate to using muons originating from cosmic rays to generate time-dependent volumetric images to automatically update or calibrate numerical reservoir models. Muons generated in the earth's atmosphere can penetrate several hundreds of meters into the subsurface. The flux of muons generally decreases with depth. Muons can be detected using scintillator arrays placed in horizontal or vertical wells where each detected muon provides information about the average density of the formation path it traveled. Each muon travels a different path, which can be inverted using image tomography techniques to obtain a volumetric description of subsurface, including geological structures and fluid movements. The resolution of the obtained image depends on the detected muon flux, which generally decreases with depth. These images can be continuously, or at least periodically, used to track movement of fluids in the hydrocarbon reservoir.

Figure 1A:
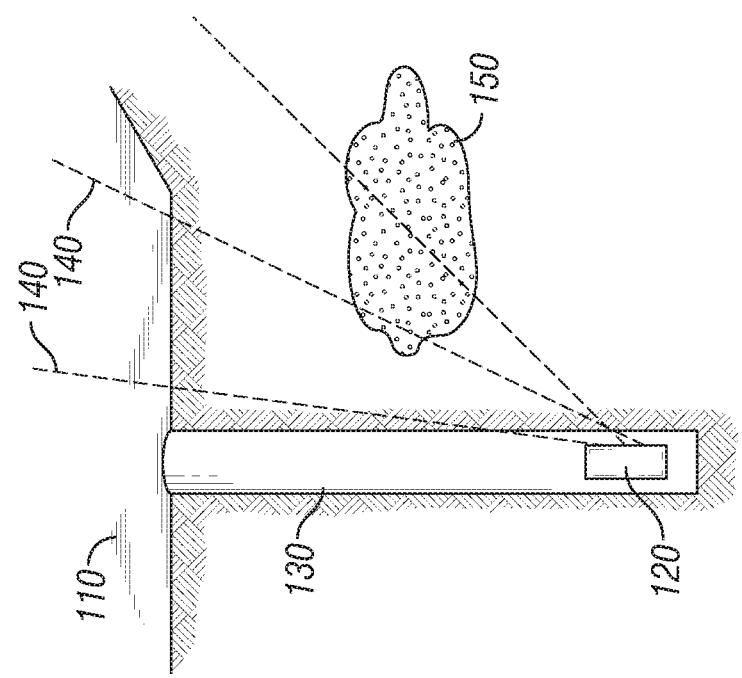

FIGS. 1A-B show muons penetrating into the earth's surface 110, in accordance with an embodiment of the disclosure. The muons may penetrate to various depths depending on their energy and the amount of material encountered along their paths. This results in a reduction of muon flux. Surviving muons may reach a muon detector 120 or an array of muon detectors 120 that are placed in a borehole 130 along the trajectories 140 of the muons as shown as dotted lines. The muon trajectories 140 may extend through a hydrocarbon reservoir 150 which has a different density than that of the surrounding geology. FIG. 1A shows a borehole 130 that is substantially vertical. FIG. 1B shows a borehole 130 that is substantially horizontal. In some embodiments, more than one boreholes 130 may exist to place multiple muon detectors 120 proximate the hydrocarbon reservoir 150 for enhanced precision. For example, two horizontal boreholes 130 can be drilled, one above the hydrocarbon reservoir 150 and one below the hydrocarbon reservoir 150. Muon detectors 120 can be placed in each borehole 130 such that muon detection data of multiple muon detectors 120 can be compared to reconstruct a volumetric density image of the hydrocarbon reservoir 150. One skilled in the art would recognize that the degree of proximity of placing the muon detector 120 with respect to the hydrocarbon reservoir may vary depending on factors such as the sensitivity and the depth of the muon detector 120, the density of hydrocarbons existing in the hydrocarbon reservoir, and the density of geological structures surrounding the hydrocarbon reservoir.

Image reconstruction of the hydrocarbon reservoir 150 can be performed by determining the incoming and outgoing muon trajectories 140 as the muons pass through the scanned volume (corresponding to the hydrocarbon reservoir 150) and the muon detector 120. The incoming and outgoing muon trajectories 140 are determined using known locations of the muon detectors 120 at which the muons were incident. Muon detection data acquired by such means can be inverted to reconstruct a volumetric density image which shows the spatial location of the hydrocarbon reservoir 150. Without being bound by any theory, the resolution of the volumetric density image may depend on the proximity of the hydrocarbon reservoir 150 relative to the earth's surface due to the quantity of muons that can be detected. Also, the resolution of the volumetric density image may depend on the proximity of the muon detector 120 relative to the earth's surface due to the quantity of muons that can be detected. In some embodiments, one may prolong the predetermined muon detection period. A time-averaged volumetric density image can be obtained.

In some embodiments, the muon detector 120 may include a scintillator. Photons are generated when ionizing radiation is deposited in the scintillator. The photons propagate in the scintillator material while undergoing multiple reflections when scattering off inner walls of the scintillator material. The scintillated photons reach the entrance of an optical detector which converts the photons into an electrical signal. This process occurs over a measurable time scale of a few nanoseconds per meter of an optical path-length. The scintillator may detect muons from all directions, including muon trajectories 140 where the hydrocarbon reservoir 150 density does not change over time.

In other embodiments, the muon detector 120 may include a drift tube. The drift tube includes a drift region filled with gas and a high voltage plane. A muon traverses the drift region and leaves a track of ionization, where ionization electrons drift towards one or both ends of the drift region due to the high voltage bias provided by the high voltage plane. The drifting electrons reach the end to produce an electrical signal. Temporal information of the electrical signals can be used to derive positional information of the incident muon.

History Matching

Figure 2:
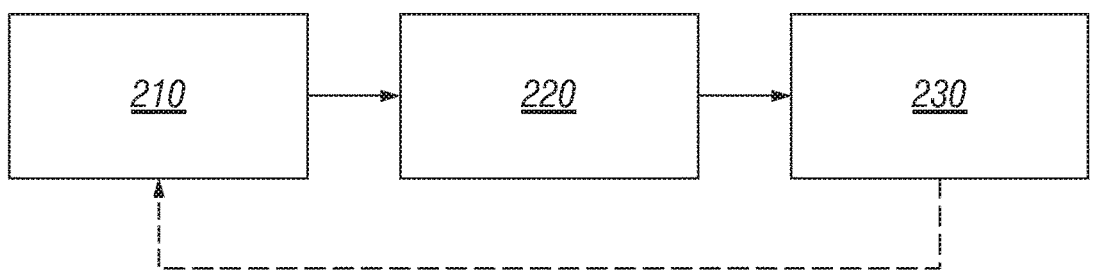
FIG. 2 is a schematic diagram for history matching of production data and muographic 4D data, in accordance with an embodiment of the disclosure.

FIG. 2 shows an example workflow 200 for history matching of production data and muographic 4D data in accordance with an embodiment of the disclosure. The workflow 200 is an iterative process as shown as the dotted arrow that updates over time as new production data, new muographic 4D data, or both, are obtained over time.

The first step in this workflow 200 as indicated by block 210 is the utilization of the previous parameters and certain state data estimates (such as static data and dynamic data) to perform the reservoir simulations to establish a set of reservoir models. The simulations are forwarded in time to predict future reservoir performance as indicated by block 220. A monitor survey is computed based on the recently updated reservoir state data at the end of the predicted period and according to the certain reservoir parameters. The time-dependent difference (that is, the difference between the monitor survey and a base survey) is then computed and used in conjunction with the predicted reservoir production data in block 230 to update the previous reservoir model estimates, as well as to serve as a starting point for the next iteration of history matching.

Embodiments of the disclosure provide quantitative incorporation of the production data and muographic 4D data in the history matching process. An automated history matching tool incorporating EnKF or EnKS is provided so that accurate estimates of permeability and porosity field data are available for the history matching process. The history matching process involves several geological realizations accounting for the uncertainties in the initial model through a probabilistic approach.

The base survey is initially acquired before production is begun in the reservoir. Subsequent surveys can be performed later during production to quantify the fluid displacement in the reservoir. The time-dependent difference (the difference between the monitor survey and the base survey or the difference between the monitor survey and the subsequent survey) is used for history matching to improve the quality of the match between actual production and the reservoir model, thus reducing the uncertainty in the porosity and permeability field data.

Ensemble Kalman Filtering

In some embodiments, to provide accurate estimates of state variables the initial ensemble is conditioned with production data and model dynamics iteratively over time. This can be achieved by using methodologies such as EnKF.

EnKF is an inverse-modelling local optimization technique originated from the Kalman Filter (KF), which has been designed originally for electrical-signal processing. EnKF provides sequential assimilation of both static and dynamic data into a model. Static and dynamic data are assimilated sequentially from only the current timestep. EnKF is based on a Bayesian framework and Monte Carlo simulation that stochastically generates reservoir models that are integrated over time to estimate probability density functions (or PDFs). A previous PDF is updated to a recent PDF incorporating recent data. This updating can be implemented independent of a reservoir simulator. The model estimate of EnKF is derived by maximizing analytically the posterior probability without any numerical optimization algorithm. Because EnKF is devised accounting for the stochastic nature of the modelling system, the system is represented by an ensemble of equally and likely to be drawn realizations of model estimates. The model covariance matrix is replaced by a sample covariance matrix, which is computed from the ensemble members. EnKF requires storing a portion of the covariance matrix that describes the model-to-data and data-to-data relationship. Instead of deriving and solving analytical equations of hydrocarbon reservoir behavior, any suitable flow simulation methodology can be coupled with EnKF to constrain the reservoir models and to predict future reservoir performance. Gradient computation is not necessary.

In some embodiments, EnKF provides a set of geological realizations which are generated to take in account the uncertainties in the geological model. This set of realizations is forwarded in time and corrected dynamically as new production data (such as true reservoir performance), new time-dependent data (such as muographic 4D data), or both are obtained over time. For each realization, a prediction of reservoir performance and a time-dependent response are generated. The prediction of reservoir performance and time-dependent response are used during the EnKF processing to estimate the covariance matrix. The production data and time-dependent data obtained from the field are used to correct states of the realizations as they are formed. Consequently, forecast values generated by these realizations approximate the observed values. By generating an ensemble of realizations and updating the ensemble over time, an error estimate of the forecast can be obtained providing additional information to the decision maker.

The EnKF uses a sample or ensemble of state vectors as provided in Equation (1):

$$\{x^i, i=1,2,\ldots,N_e\} \quad \text{Equation (1)}$$

where $N_e$ denotes the number of ensemble members. Assume that a set of an analysis ensemble $\{x_{k-1}^{a,i}, i=1, 2, \ldots, N_e\}$ is available at a given time $t_{k-1}$ (superscript a referring to analysis). At every forecast step, all ensemble members are integrated forward in time with the reservoir model of the next observation (that is, the reservoir model at time $t_k$) to compute a forecast ensemble $\{x_k^{f,i}, i=1, 2, \ldots, N_e\}$ (superscript f referring to forecast) represented by Equation (2):

$$x_k^{f,i} = \mathcal{M}_{k-1,k}(x_{k-1}^{a,i}) + \eta_k^i + \quad \text{Equation (2)}$$

where $\mathcal{M}_{k-1,k}$ is the dynamic model forward operator corresponding to times $t_{k-1}$ and $t_k$, and $\eta_k^i$, is the $i^{th}$ column noise at time $t_k$. The state estimate (taken as a sample mean of the forecast ensemble) and the associated covariance matrix are respectively estimated using Equation (3) and Equation (4):

$$\bar{x}_k^f = \frac{1}{N_e}\sum_{i=1}^{N_e} x_k^{f,i} \quad \text{Equation (3)}$$

$$\hat{P}_k^f = \frac{1}{N_e-1}\sum_{i=1}^{N_e}(x_k^{f,i} - \bar{x}_k^f)(x_k^{f,i} - \bar{x}_k^f)^T \quad \text{Equation (4)}$$

where $\bar{x}_k^f$ is the forecast ensemble average at time $t_k$, $\hat{P}_k^f$ is the associated covariance matrix of the forecast ensemble at time $t_k$, and superscript T is the transpose of a given matrix. The associated covariance matrix can be written as in Equation (5):

$$\hat{P}_k^f = X_k^f(X_k^f)^T \quad \text{Equation (5)}$$

where the $i^{th}$ column of $X_k^f$ is $$(N_e - 1)^{-\frac{1}{2}}(x_k^{f,i} - \bar{x}_k^f).$$

The analysis step is performed to every member of the forecast ensemble using the linear KF update Equation (6):

$$x_k^{a,i} = x_k^{f,i} + \hat{K}_k[y_k^i - H_k x_k^{f,i}] \quad \text{Equation (6)}$$

where $\hat{K}_k$ is the ensemble-based approximate Kalman gain at time $t_k$ provided in Equation (7):

$$\hat{K}_k = X_k^f(H_k X_k^f)^T[(H_k X_k^f)(H_k X_k^f)^T + R_k]^{-1} \quad \text{Equation (7)}$$

$y_k^i$ is the observation perturbed with noise sampled from the distribution of the observational error at time $t_k$, $H_k$ is the linear measurement operator at time $t_k$, and $R_k$ is a covariance matrix corresponding to the observational error at time $t_k$.

The analysis state and its covariance matrix are then expressed by Equation (8) and Equation (9), respectively:

$$\bar{x}_k^a = \frac{1}{N_e}\sum_{i=1}^{N_e} x_k^{a,i} \quad \text{Equation (8)}$$

$$\hat{P}_k^a = \frac{1}{N_e-1}\sum_{i=1}^{N_e}(x_k^{a,i} - \bar{x}_k^a)(x_k^{a,i} - \bar{x}_k^a)^T \quad \text{Equation (9)}$$

Parameters including porosity, permeability, saturation, and pressure are included in the state vector during processing according to embodiments of the disclosure. Permeability and porosity correspond to static variables. Pressure and phase saturation correspond to dynamic variables, that is, variables produced by the reservoir simulator in runtime. The assimilated data include production data obtained from the original model perturbed with Gaussian errors.

Ensemble Kalman Smoothing

In some embodiments, to provide accurate estimates of state variables the initial ensemble is conditioned with historical data and model dynamics iteratively over time. This can be achieved by using methodologies such as EnKS.

EnKS is a modification of EnKF, where static and dynamic data are integrated sequentially and the model is updated up to the current timestep conditional to static and dynamic data from current and previous timesteps. In terms of reservoir modelling, EnKS can provide realistic forecasts because the state vector generally involves static properties such as permeability and porosity, which seldom change over time. EnKF would require the simulator to restart at every single assimilation step. EnKF would also require a fall back mechanism for dynamic variables such as pressure and phase saturation deviating from a predetermined range or value. On the other hand, EnKS makes all changes at the end of the simulation cycle by integrating over the entire simulation time and undergoing reiteration if necessary. The simulations are submitted in batch and the results are analyzed after the full simulation batch has concluded.

Muography Assisted History Matching

History matching algorithms such as EnKF or EnKS can assimilate muographic 4D data even in cases where the generated volumetric image results in a pixelated image. The muographic 4D data can be used to reduce the uncertainty of the ensemble as the amount of muographic 4D data accumulates over time (for example, from the muon detectors). The muographic 4D data can be continuously, or at least periodically, fed into the history matching loops of EnKF or EnKS such that the reservoir model can be updated. Accordingly, the updated reservoir model provides an accurate forecast to the decision maker. The accuracy of history matching techniques relies on the quality of the reservoir model and the quality and quantity of the actual data.

Figure 3:
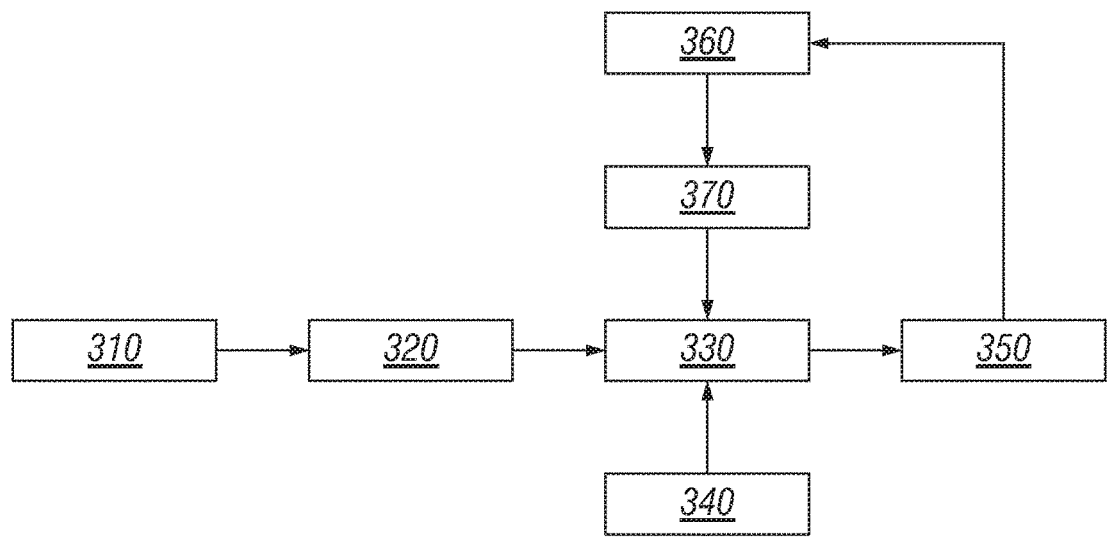
FIG. 3 is a schematic diagram showing a muography assisted history matching reservoir modelling workflow, in accordance with an embodiment of the disclosure.

FIG. 3 shows a process 300 illustrating the muography assisted history matching reservoir modelling workflow in accordance with an embodiment of the disclosure. FIG. 3 also illustrates the computational methodology taking place during history matching of muographic 4D data using EnKF or EnKS in accordance with an embodiment of the disclosure.

In block 310, a static geological model is constructed by utilizing static data. Actual static data including certain geophysical and petrophysical data can be acquired at various observation locations of the reservoir. In some embodiments, the data include data sets of well logs, seismic, core, and petrophysical information of the hydrocarbon reservoir. An initial estimate of several possible realizations of a reservoir model is constructed. In some embodiments, the static model can include an ensemble of models to reduce uncertainty in the actual data. The uncertainty associated with the actual static data can be addressed by creating a set of equiprobable scenarios. For example, a set of equiprobable scenarios can be created by implementing two scenarios having different permeability distributions generated by a sequential Gaussian simulation where both distributions reflect the well data and variograms specified by the geomodeler. The variability (corresponding to uncertainty)

between the two scenarios may increase when the permeability distributions significantly deviate from data points provided by quantitative data. In other embodiments, the static model can include a single model.

In block 320, a dynamic model is constructed by utilizing the single static model or the ensemble of static models established in block 310. In addition, the dynamic model is constructed by incorporating dynamic data such as fluid flow properties. Fluid flow properties may include viscosity and density. The dynamic model can include pressure, volume, and temperature dependencies for the fluid flow properties. The dynamic model can include flow equations and solutions of the flow equations. In some embodiments, the static model can be upscaled to reduce the number of cells used in the simulation. As used throughout the disclosure, the term "cell" refers to an elementary spatial discretization within a partial differential equation where unknown multivariable functions are considered constant. The number of cells (or grid blocks) correspond to the complexity of the reservoir model. The number of cells correspond to the complexity of the linear system to be solved in a simulation model. As used throughout the disclosure, the term "upscaling" refers to a process of averaging a series of cells into a reduced number of cells. The objective is to reduce the overall number of cells while preserving the underlying flow characteristics. Still in block 320, the dynamic model can be run reflecting a subset of historical production constraints such as production data including historical oil or liquid production rates.

In block 330, the ensemble corresponding to the dynamic reservoir model realizations constructed in block 320 is iteratively updated (or calibrated) by inputs provided in blocks 320 and 370. In some embodiments, the updating process (or history matching) can be executed manually. In other embodiments, history matching can be executed in an automatic fashion (automated history matching) by incorporating certain mathematical algorithms and specialized software packages. The ensemble can be calibrated by history matching techniques such as an EnKF or EnKS. These techniques can assimilate data while accounting for measurement and model errors. In some embodiments, block 330 includes forecasting hydrocarbon production based on the updated ensemble. In some embodiments, the updated reservoir model can be imaged as an output.

Still in block 330, as part of the history matching utilizing EnKF or EnKS processing, the dynamic reservoir model realizations initially constructed in block 320 are iterated sequentially based on the production data gathered since the last iteration in block 340. In block 340, the production data includes historical data and i-field data. The dynamic reservoir model realizations initially formed in block 320 are iterated sequentially based on the muographic 4D data gathered since the last iteration in block 370. Muography assisted history matching involves a constant input flow of muographic 4D data, which can be averaged over time. The muographic 4D data input provided in block 370 includes a volumetric image of fluid saturations with a varying range of uncertainty based on the number of muon detection events over the predetermined timeframe. Both the muographic 4D data provided in block 370 and historical data and i-field data provided in block 340 are available in real time or at least periodically. This allows the ensemble-based reservoir model to continuously or at least periodically update itself as new inputs of muographic 4D data, historical data, and i-field data are introduced over time such that the reservoir model can assimilate the data. In some embodiments, simulation time and computing power can be reduced by updating the reservoir model when significant changes in density are observed in the reservoir.

In block 350, the updated ensemble run by an iteration in block 330 undergoes a consistency check. Production and pressure responses generated as simulated outputs in block 330 are compared with available historical data and i-field data provided in block 340 to determine a time-dependent difference. If the time-dependent difference does not deviate more than a predetermined range or value between production and pressure responses, historical data, and i-field data, the time-dependent difference and the predicted reservoir model simulated for each ensemble member is incorporated in the history matching loop by EnKF or EnKS. The observed data (reservoir performance and time-dependent data) is perturbed with Gaussian errors by a user specified standard deviation. The square of these same values are used as given variances of the observational errors in the computation of the Kalman gain matrix in Equation (7), which are assumed uncorrelated (that is, covariance matrix R is diagonal). The Kalman gain matrix is computed taking as input the predicted reservoir performance, the time-dependent difference for each ensemble member, and the covariance matrix as expressed by Equation (7). The Kalman gain is used to update the state vector by means of Equation (6).

Still in block 350, if the time-dependent difference deviates more than a predetermined range or value between production and pressure responses, historical data, and i-field data (that is, the predicted reservoir model does not pass the consistency check), input parameters of the dynamic model can be manually corrected such that the simulation can be restarted.

In blocks 360 and 370, volumetric density data provided by obtaining saturation fields generated by muons can be incorporated into the assisted history matching loop to improve the quality of the calibration process.

In block 360, each muon detection event provides information regarding the muon trajectory and the average density along the trajectory path as shown for example in FIG. 1. In block 370, muon detection data obtained in block 360 is used for tomographic inversion to create a time-dependent volumetric density image of the hydrocarbon reservoir. Optionally, muon detection period can be adjusted based on the uncertainty or resolution of the inverted tomographic image. The adjustment of the muon detection period may alter the waiting time for each ensemble update. For example, the detection period can be extended to obtain more muon detections in block 360 before the ensemble updating process in block 330 is initiated in the next iteration. In the next iteration, a time-averaged volumetric density image can be obtained in block 370. In some embodiments, such time-averaged volumetric density image can be a pixelated image that still can be assimilated by EnKF or EnKS.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for surveying a hydrocarbon reservoir utilizing a reservoir model, the method comprising the steps of:
   establishing an ensemble of models reflecting attributes of the hydrocarbon reservoir based on the reservoir model in its present state;
   obtaining muon detection data collected over a detection period from a muon detector at a subterranean location proximate the hydrocarbon reservoir;
   constructing, via tomography processing of the muon detection data, a volumetric density image of the hydrocarbon reservoir;
   obtaining subsequent muon detection data collected after a time increment from a muon detector at a subterranean location proximate the hydrocarbon reservoir;
   constructing, via tomography processing of the subsequent muon detection data, a subsequent volumetric density image of the hydrocarbon reservoir; and
   updating the reservoir model by utilizing a volumetric density image of the hydrocarbon reservoir, the updating comprising adjusting the reservoir model utilizing the subsequent volumetric density image.

2. The method of claim 1, where the volumetric density image is constructed via muon tomography.

3. The method of claim 1, further comprising the step of:
   forecasting a hydrocarbon production from the hydrocarbon reservoir with the reservoir model in the updating step.

4. The method of claim 1, further comprising the step of:
   imaging the reservoir model in the updating step.

5. The method of claim 1, where the updating step includes performing one selected from the group consisting of: Ensemble Kalman Filtering, Ensemble Kalman Smoothing, and combinations of the same.

6. The method of claim 1, where the attributes of the hydrocarbon reservoir include one selected from the group consisting of: static data, dynamic data, and combinations of the same.

7. The method of claim 1, where the updating step includes providing production data to update the reservoir model.

8. The method of claim 7, further comprising the step of:
   comparing the production data and the reservoir model in the updating step.

9. The method of claim 8, where the comparing step includes correcting input parameters of the reservoir model when a difference between the production data and the reservoir model deviates from a predetermined value.

10. A method for surveying a hydrocarbon reservoir utilizing a reservoir model, the method comprising the steps of:
    positioning a muon detector at a subterranean location proximate the hydrocarbon reservoir;
    collecting muon detection data from the muon detector over a detection period; and
    constructing a volumetric density image of the hydrocarbon reservoir by processing the muon detection data via tomography,
    collecting subsequent muon detection data from the muon detector after a time increment;
    constructing a subsequent volumetric density image of the hydrocarbon reservoir by processing the subsequent muon detection data via tomography; and
    updating the reservoir model utilizing the volumetric density image, the updating comprising adjusting the reservoir model utilizing the subsequent volumetric density image.

11. The method of claim 10, further comprising the step of:
    forecasting a hydrocarbon production from the hydrocarbon reservoir with the reservoir model in the updating step.

12. The method of claim 10, further comprising the step of:
    imaging the reservoir model in the updating step.

13. The method of claim 10, where the muon detector includes one selected from the group consisting of: a scintillator, a drift tube, and combinations of the same.

14. The method of claim 10, further comprising the step of:
    altering the detection period based on a resolution of the volumetric density image.

15. A method for surveying a hydrocarbon reservoir utilizing a reservoir model, the method comprising the steps of:
    establishing an ensemble of models reflecting attributes of the hydrocarbon reservoir based on the reservoir model in its present state;
    positioning a muon detector at a subterranean location proximate the hydrocarbon reservoir;
    collecting muon detection data from the muon detector over a detection period;
    constructing a volumetric density image of the hydrocarbon reservoir by processing the muon detection data via tomography;
    collecting a subsequent muon detection data from the muon detector after a time increment;
    constructing a subsequent volumetric density image of the hydrocarbon reservoir by processing the subsequent muon detection data via tomography; and
    updating the reservoir model by utilizing the volumetric density image, the updating comprising adjusting the reservoir model utilizing the subsequent volumetric density image.

16. The method of claim 15, further comprising the step of:
    forecasting a hydrocarbon production from the hydrocarbon reservoir with the reservoir model in the updating step.

17. The method of claim 15, further comprising the step of:
    imaging the reservoir model in the updating step.

18. The method of claim 15, where the updating step includes performing one selected from the group consisting of: Ensemble Kalman Filtering, Ensemble Kalman Smoothing, and combinations of the same.

19. The method of claim 15, where the attributes of the hydrocarbon reservoir include one selected from the group consisting of: static data, dynamic data, and combinations of the same.

20. The method of claim 15, where the updating step includes providing production data to update the reservoir model.

21. The method of claim 20, further comprising the step of:
    comparing the production data and the reservoir model in the updating step.

22. The method of claim 21, where the comparing step includes correcting input parameters of the reservoir model when a difference between the production data and the reservoir model deviates from a predetermined value.

23. The method of claim 15, further comprising the step of:
- altering the detection period based on a resolution of the volumetric density image.

\* \* \* \* \*

UNITED STATES PATENT AND TRADEMARK OFFICE
CERTIFICATE OF CORRECTION

| | | |
|---|---|---|
| PATENT NO. | : 11,125,905 B2 | Page 1 of 1 |
| APPLICATION NO. | : 16/402317 | |
| DATED | : September 21, 2021 | |
| INVENTOR(S) | : Cancelliere et al. | |

It is certified that error appears in the above-identified patent and that said Letters Patent is hereby corrected as shown below:

In the Claims

In Column 13, Claim 10, Line 61 should read:
-- over a detection period; --

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*